(12) United States Patent
Yamahata et al.

(10) Patent No.: US 9,181,680 B2
(45) Date of Patent: Nov. 10, 2015

(54) MOTOR GRADER

(71) Applicant: KOMATSU LTD., Tokyo (JP)

(72) Inventors: Takanori Yamahata, Komatsu (JP);
Satoshi Nakagawa, Komatsu (JP);
Masahiko Hamaguchi, Nomi (JP);
Junichi Suneya, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/370,240

(22) PCT Filed: Mar. 28, 2014

(86) PCT No.: PCT/JP2014/059213
§ 371 (c)(1),
(2) Date: Jul. 2, 2014

(87) PCT Pub. No.: WO2015/004959
PCT Pub. Date: Jan. 15, 2015

(65) Prior Publication Data
US 2015/0275481 A1    Oct. 1, 2015

(51) Int. Cl.
*B62D 1/18* (2006.01)
*E02F 9/20* (2006.01)
(Continued)

(52) U.S. Cl.
CPC .............. *E02F 9/2004* (2013.01); *B62D 1/189* (2013.01); *E02F 3/7636* (2013.01)

(58) Field of Classification Search
CPC .......... B62D 1/18; B62D 1/183; B62D 1/184; B62D 1/189; B60K 23/00; B60K 26/02; B60K 35/00; B60K 37/06; B60N 2/4606; B60N 2/4693; B60N 2/4876; B60N 2/143; B60N 2/464; E02F 3/7636; E02F 5/32; E02F 3/84; E02F 9/16; E02F 9/2004; E02F 9/163

USPC ................. 37/234, 382, 466; 74/493, 473.15, 74/473.34; 172/4.5, 780, 796, 797; 180/89.13, 330–334, 326; 280/775
See application file for complete search history.

(56) References Cited

U.S. PATENT DOCUMENTS 4,682,787 A * 7/1987 Ruhter et al. .................. 280/775
4,706,776 A * 11/1987 Hyoki et al. ................... 180/334
(Continued)

FOREIGN PATENT DOCUMENTS

| | | |
|---|---|---|
| JP | 63-56756 U | 4/1988 |
| JP | 11-158923 A | 6/1999 |
| WO | 2012/165279 A1 | 12/2012 |

OTHER PUBLICATIONS

The International Search Report for the corresponding international application No. PCT/JP2014/059213, issued on Jul. 1, 2014.
(Continued)

*Primary Examiner* — Robert Pezzuto
(74) *Attorney, Agent, or Firm* — Global IP Counselors, LLP

(57) ABSTRACT

A steering post has a post end part positioned at an upper end on the front surface of the steering post. A case section has a case end part positioned at a lower end on the front surface of the case section. A gap is provided between the post end part and the case end part. A cover member is disposed to cover the gap. The cover member has a shape that is curved to not intersect a locus of the case end part when the case section is tilted with respect to the steering post. A lower end part of the cover member is connected to the post end part. An upper end part of the cover member is disposed above the case end part inside the case section.

15 Claims, 13 Drawing Sheets

(51) Int. Cl.
  *B62D 1/189* (2006.01)
  *E02F 3/76* (2006.01)

(56) References Cited

U.S. PATENT DOCUMENTS

| | | | | |
|---|---|---|---|---|
| 4,821,837 | A * | 4/1989 | Fifer | 180/334 |
| 5,632,353 | A * | 5/1997 | Kimberley | 180/326 |
| 6,148,688 | A * | 11/2000 | Nishimaki | 74/493 |
| 7,036,250 | B2 * | 5/2006 | Dressler et al. | 37/466 |
| D556,790 | S | 12/2007 | Harber et al. | |
| 7,913,798 | B2 * | 3/2011 | Frett et al. | 180/333 |
| 8,434,562 | B2 * | 5/2013 | Miyasaka et al. | 172/431 |
| 8,505,646 | B2 * | 8/2013 | Yamamoto | 172/781 |
| 2006/0144634 | A1 * | 7/2006 | Portscheller et al. | 180/330 |
| 2013/0168116 | A1 | 7/2013 | Yamamoto | |

OTHER PUBLICATIONS

The International Written Opinion for the orresponding international application No. PCT/JP2014/059213, issued on Jul. 1, 2014.

* cited by examiner

MOTOR GRADER

CROSS-REFERENCE TO RELATED APPLICATIONS

This application is a U.S. National stage application of International Application No. PCT/JP2014/059213, filed on Mar. 28, 2014.

BACKGROUND

1. Field of the Invention

The present invention relates to a motor grader

2. Background Information

A motor grader is generally equipped with a steering member, a case section, and a steering post. The steering member is a steering wheel for example, and is attached to the case section. The case section is supported by the steering post. The steering post is disposed in front of a cab.

For example, the case section in the motor grader in U.S. Design Pat. No. D556,790 is attached in to the steering post in a tiltable manner. As a result, a gap is provided between a lower end part of the front surface of the case section and an upper end part of the front surface of the steering post to avoid interference with the steering post when the case section is tilted.

SUMMARY

When the gap is provided between the case section and the steering post as in the above motor grader, water can enter the inside of the case section from the gap due to rain or when washing the vehicle. In this case, there is a fear that the problem of an electrical short circuit may occur due to the water when electrical components are disposed inside the case section.

An object of the present invention is to provide a motor grader in which interference with the steering post is avoided when the case section is tilted and in which waterproofing of the inside of the case section is improved.

A motor grader according to a first aspect of the present invention is equipped with a floor section, a cab, a steering post, a case section, a steering member, electric components, and a cover member. The cab is disposed on the floor section. The steering post is disposed in front of the cab and is disposed upright on the floor section. The case section is attached to the steering post in a manner that allows tilting around a center axis that extends in the vehicle width direction. The steering member is attached to the case section. The electric components are disposed inside the case section. The cover member is attached to the steering post and is at least partially disposed inside the case section. The steering post has a post end part that is positioned at an upper end on the front surface of the steering post. The case section has a case end part that is positioned at a lower end on the front surface of the case section. A gap is provided between the post end part and the case end part. The cover member is disposed to cover the gap. The cover member has a shape that is curved to not intersect a locus of the case end part when the case end part is tilted with respect to the steering post. A lower end part of the cover member is connected to the post end part. An upper end part of the cover member is disposed higher than the case end part inside the case section.

The gap is provided between the post end part and the case end part in the motor grader according to an exemplary embodiment of the present embodiment. As a result, interference between the case section and the steering post can be avoided. The cover member covers the gap between the case section and the steering post and therefore waterproofing of the inside of the case section can be improved. The cover member has a shape that is curved to not intersect the locus of the case end part when the case end part is tilted with respect to the steering post. As a result, interference between the cover member and the case section can be avoided. Furthermore, the upper end part of the cover member is disposed above the case end part inside the case section. As a result, waterproofing of the inside of the case section is improved while the cover member is disposed to not interfere with the case section.

The cover member is preferably disposed apart from the case end part. In this case, interference between the case section and the steering post can be avoided. Furthermore, wear on the cover member can be suppressed in comparison to when the cover member slides against the case end part. Furthermore, assembly can be improved in comparison to when the cover member is attached across the case section and the steering post.

The cover member preferably has a shape that is curved convexly toward the rear. In this case, interference between the cover member and the case section can be avoided.

The cover member preferably has a cross-section in the shape of the letter J. In this case, interference between the cover member and the case section can be avoided.

The cover member preferably has a cross-section in the shape of the letter L. In this case, interference between the cover member and the case section can be avoided.

A lower part of the front surface of the case section preferably has a curved shape that is inclined downward and to the rear. In this case, the gap between the case end part and the cover member can be made smaller. Accordingly, waterproofing can be further improved.

The front surface of the case section preferably has a main front surface part and an inclined surface part. The inclined surface part is connected to the lower end part of the main front surface part and is inclined downward and to the rear with respect to the main front surface part. The cover member has a predetermined portion that is furthest away from a first virtual plane that includes an inner surface of the front surface of the steering post as seen in a side cross-sectional view. The distance between the first virtual plane and the predetermined portion is larger than a distance between the case end part and a second virtual plane that includes an inner surface of the main front surface part.

In this case, the curved amount toward the rear of the cover member is larger than a curved amount toward the rear of the case end part. As a result, interference between the case section and the cover member is suppressed while the tilting range of the case section with respect to the steering post can be increased.

According to an exemplary embodiment of the present invention, a motor grader can be provided in which interference with the steering post is avoided when the case section is tilted and in which waterproofing of the inside of the case section is improved.

DETAILED DESCRIPTION OF EXEMPLARY EMBODIMENTS

Figure 1:
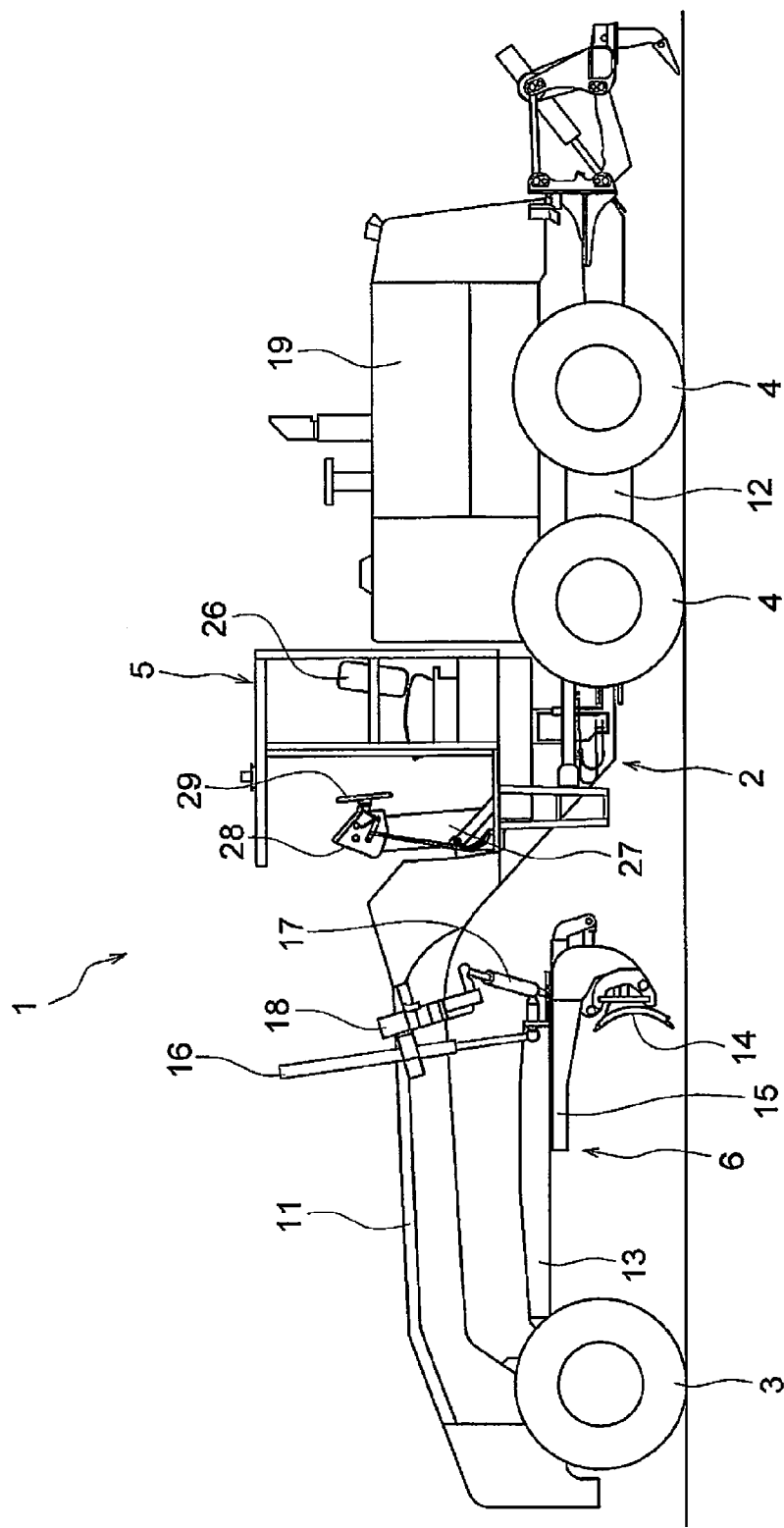
FIG. 1 is side view of a motor grader.

Exemplary embodiments of a motor grader 1 according to the present invention will be explained below with reference to the drawings. FIG. 1 is a side view of the entire configuration of the motor grader 1. In the following explanation, "up," "down," "left," "right," "front," and "rear" signify directions as seen by an operator of the motor grader 1. The motor grader 1 is equipped with a frame 2, front wheels 3, rear wheels 4, a cab 5, and a work implement 6.

The frame 2 is configured by a front frame 11 and a rear frame 12. The rear end of the front frame 11 is attached in a manner that allows swinging to the right and left to the front end of the rear frame 12. The rear frame 12 supports an engine room 19. The engine room 19 is disposed to the rear of the cab 5. An engine and a hydraulic pump and the like, which are not included in the figures, are disposed in the engine room 19.

The front wheels 3 are attached to a front part of the front frame 11. The rear wheels 4 are attached to the rear frame 12. The cab 5 is disposed on the front frame 11. The front frame 11 extends forward from the cab 5. However, the cab 5 may be disposed on the rear frame 12.

The work implement 6 has a drawbar 13, a blade 14, a blade turning device 15, a pair of lift cylinders 16, and a shift cylinder 17. The drawbar 13 is disposed below the front frame 11. The drawbar 13 is attached to the front part of the front frame 11 in a manner that allows swinging up and down. The blade 14 is supported on a rear part of the drawbar 13 via the blade turning device 15. The blade turning device 15 causes the blade 14 to turn. The blade turning device 15 has, for example, a hydraulic motor and a gear that transmits the tilt of the hydraulic motor to the blade 14.

The pair of lift cylinders 16 are coupled to the front frame 11 via a lifter bracket 18. The pair of lift cylinders 16 are coupled to the drawbar 13. The blade 14 moves up and down due to the extension and contraction of the pair of lift cylinders 16. The shift cylinder 17 is coupled to the front frame 11 via the lifter bracket 18. The shift cylinder 17 is coupled to the drawbar 13. The drawbar 13 moves to the right and left due to the extension and contraction of the shift cylinder 17.

Figure 2:
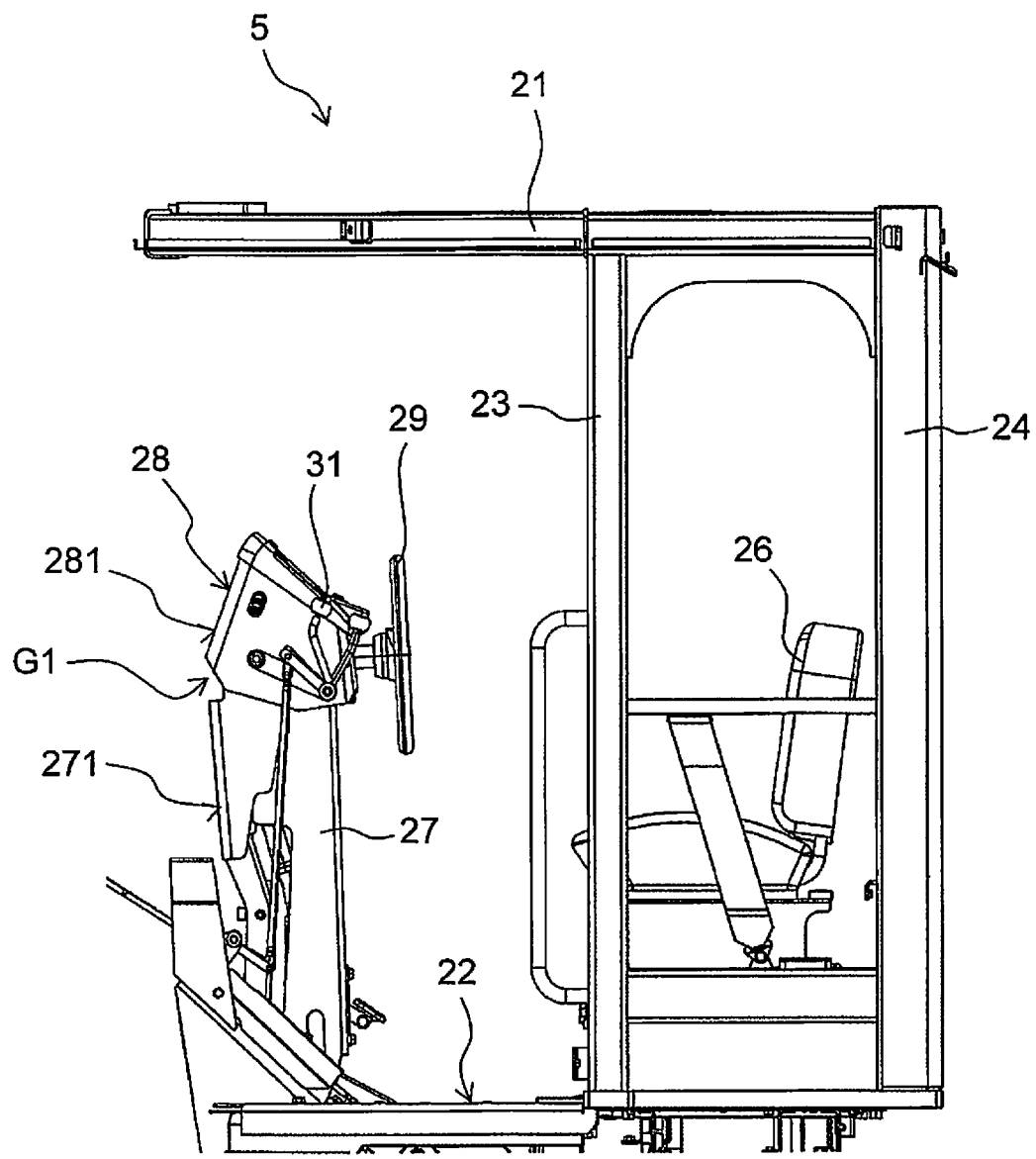
FIG. 2 is side view of a cab.
Figure 3:
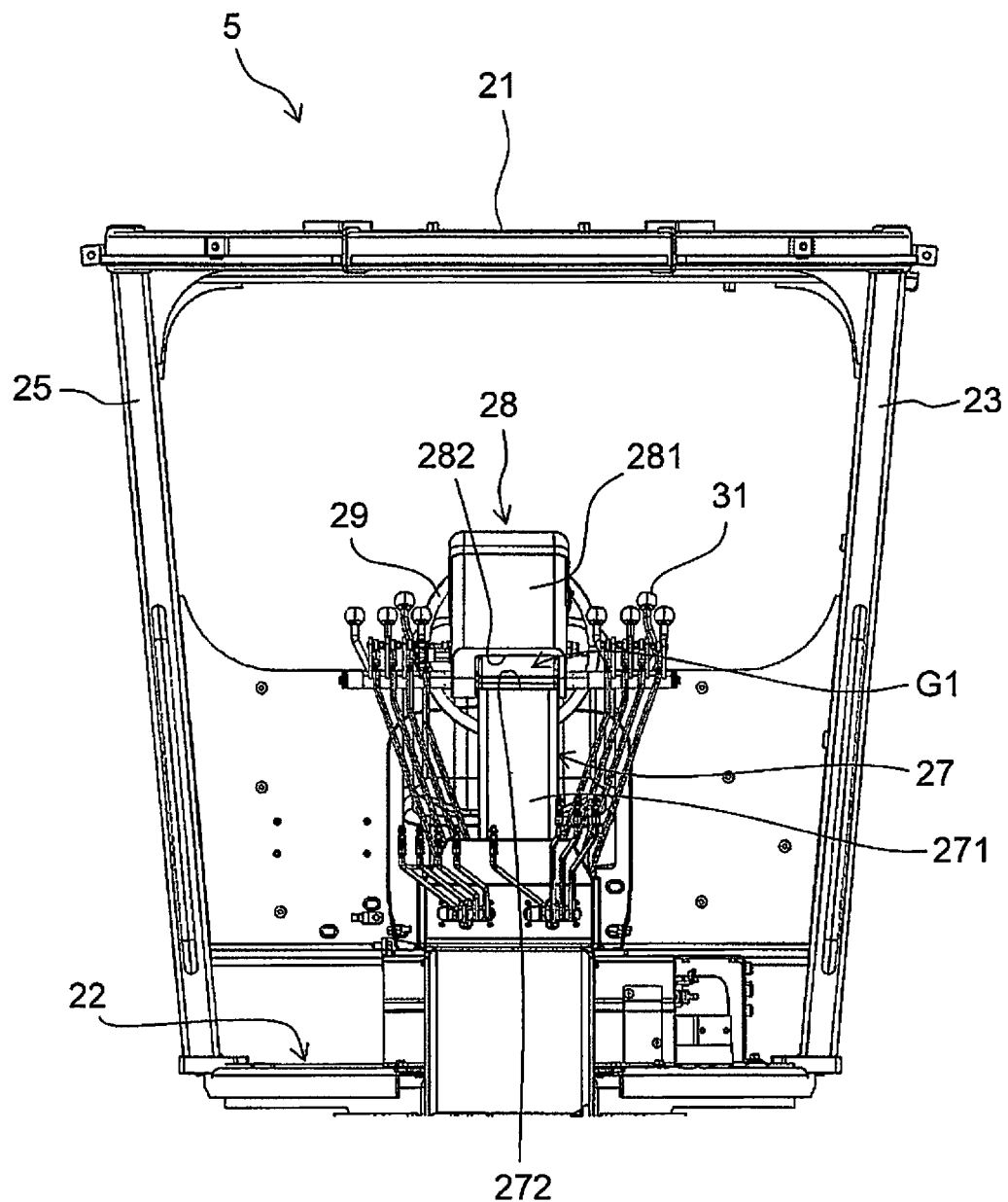
FIG. 3 is front view of the cab.

FIG. 2 is a side view of the cab 5. FIG. 3 is a front view of the cab 5. The cab 5 does not have windows or doors and is a so-called canopy-type cab. As illustrated in FIGS. 2 and 3, the cab 5 has a roof section 21, a floor section 22, and a plurality of pillars 23 to 25. The floor section 22 is disposed on the frame 2. The plurality of pillars 23 to 25 are disposed upright on the floor section 22. The roof section 21 is supported by the plurality of pillars 23 to 25.

A cab 26 and a steering post 27 are disposed on the floor section 22. The steering post 27 is disposed in front of the cab 26. The steering post 27 is disposed upright on the floor section 22. No window or door is disposed in front of or to the both sides of the steering post 27 and thus the steering post 27 is exposed to the outside.

A case section 28 is attached to an upper part of the steering post 27. A steering member 29 is attached to the case section 28. In the present embodiment, the steering member 29 is a steering wheel. However, the steering member 29 may be another member other than a steering wheel. An operating member 31 is attached to the case section 28. For example, the operating member 31 is a lever for operating the work implement 6.

A pilot hydraulic pressure pipe, which is not illustrated, is connected to the operating member 31. Hydraulic fluid for operating the work implement 6 flows in the pilot hydraulic pressure pipe. Only one reference numeral "31" for the operating member 31 is included in FIGS. 2 and 3, and reference numerals for other operating members 31 are omitted.

Figure 4:
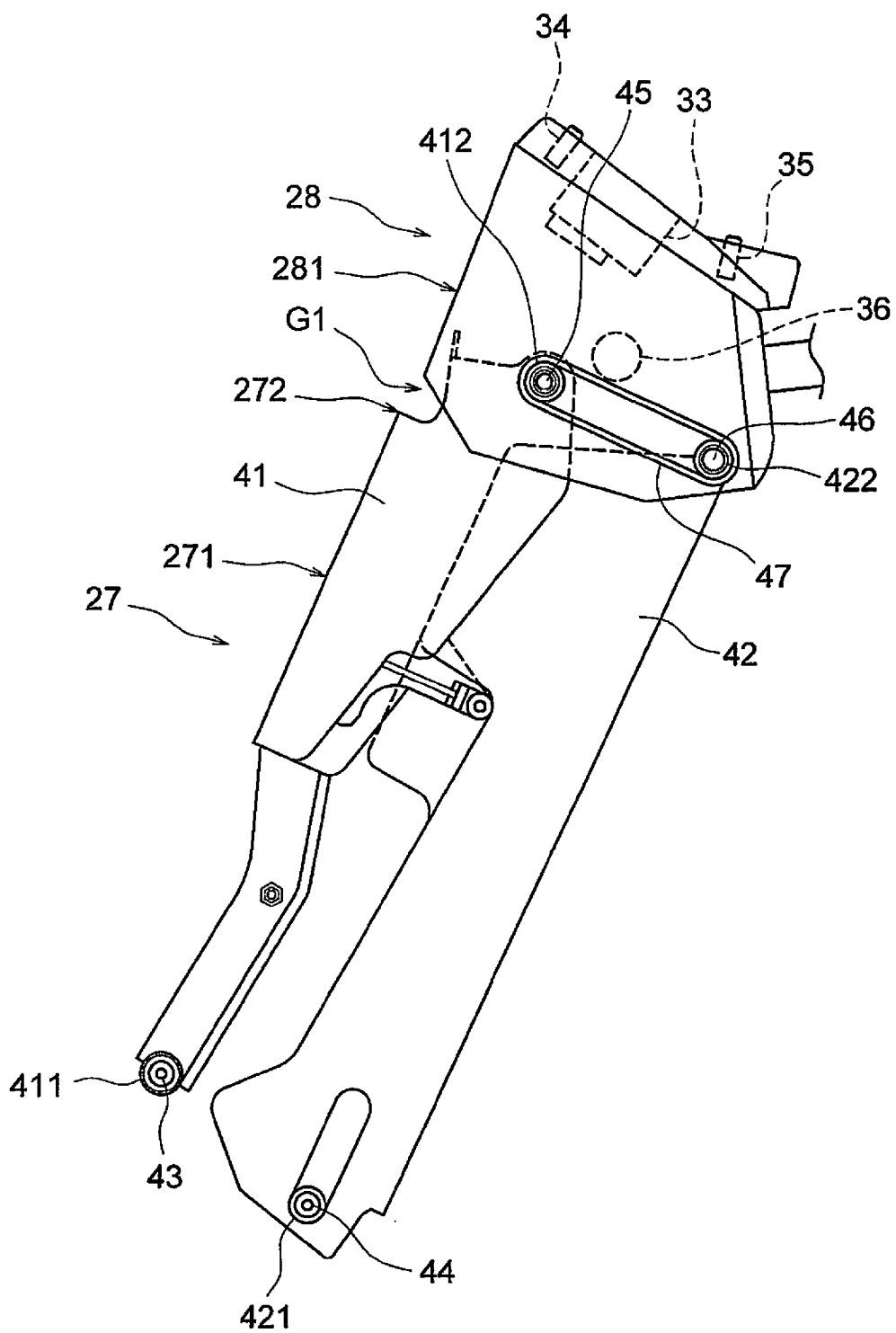
FIG. 4 is a side view of a structure of a steering post and a case section.

FIG. 4 is a side view of a structure of the steering post 27 and the case section 28. As illustrated in FIG. 4, a monitor 33 is attached to the case section 28. The monitor 33 includes, for example, a liquid crystal display and displays various types of information related to the motor grader 1. Lamps 34 and 35 are attached to the case section 28. The lamps 34 and 35 include various types of warning lights and instruction lights. A buzzer 36 is disposed inside the case section 28. In this way, electric components such as the monitor 33, the lamps 34 and 35, and the buzzer 36 and electric cables connected to the electric components are disposed inside the case section 28.

The steering post 27 is attached to the floor section 22 in a manner that allows tilting around a center axis that extends in the vehicle width direction. The case section 28 is attached to the steering post 27 in a manner that allows tilting around a center axis that extends in the vehicle width direction. As a result, the position of the steering member 29 can be changed to the front and to the rear.

Figure 5:
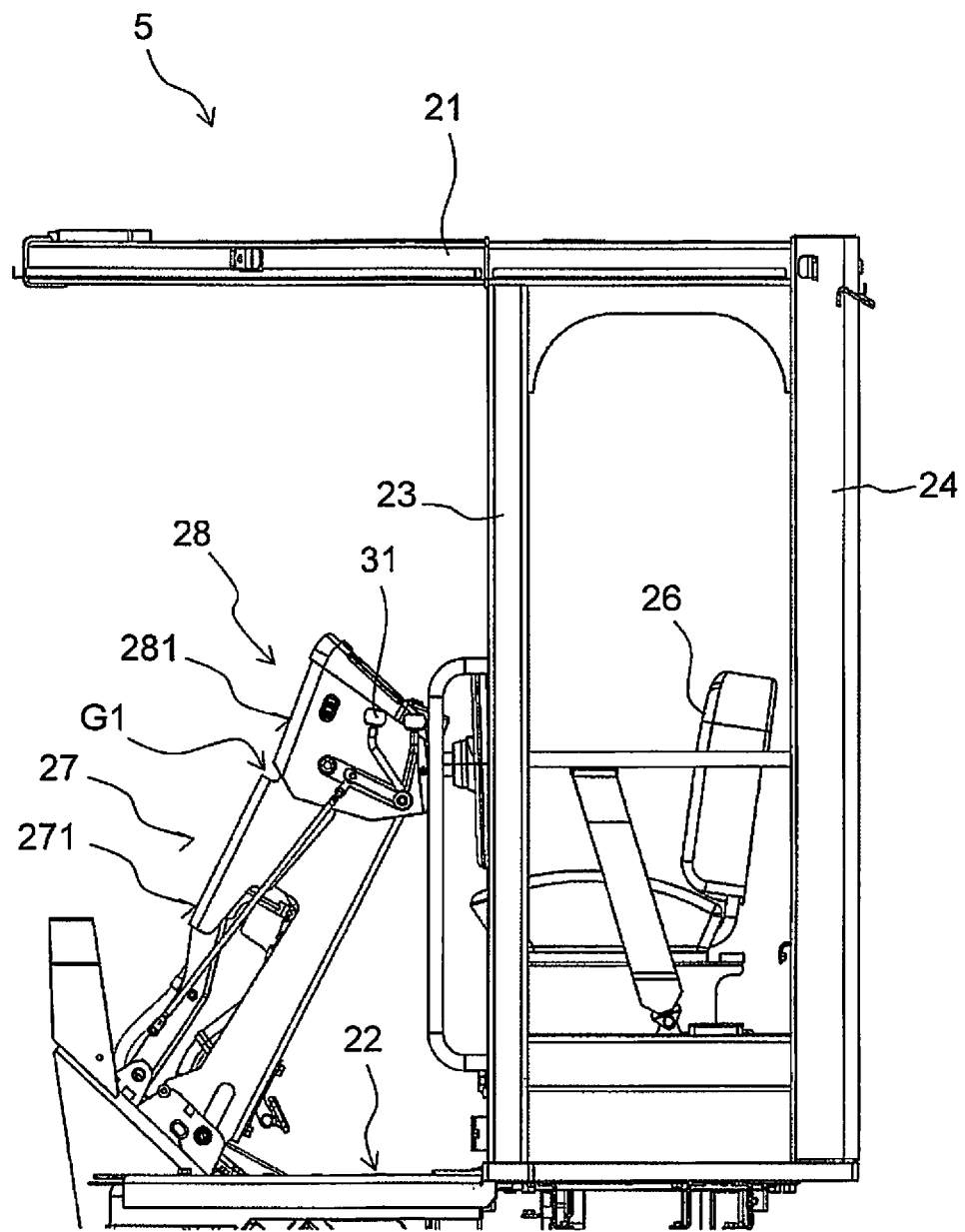
FIG. 5 is a side view of the cab in a state in which a steering member is disposed furthest to the rear.
Figure 6:
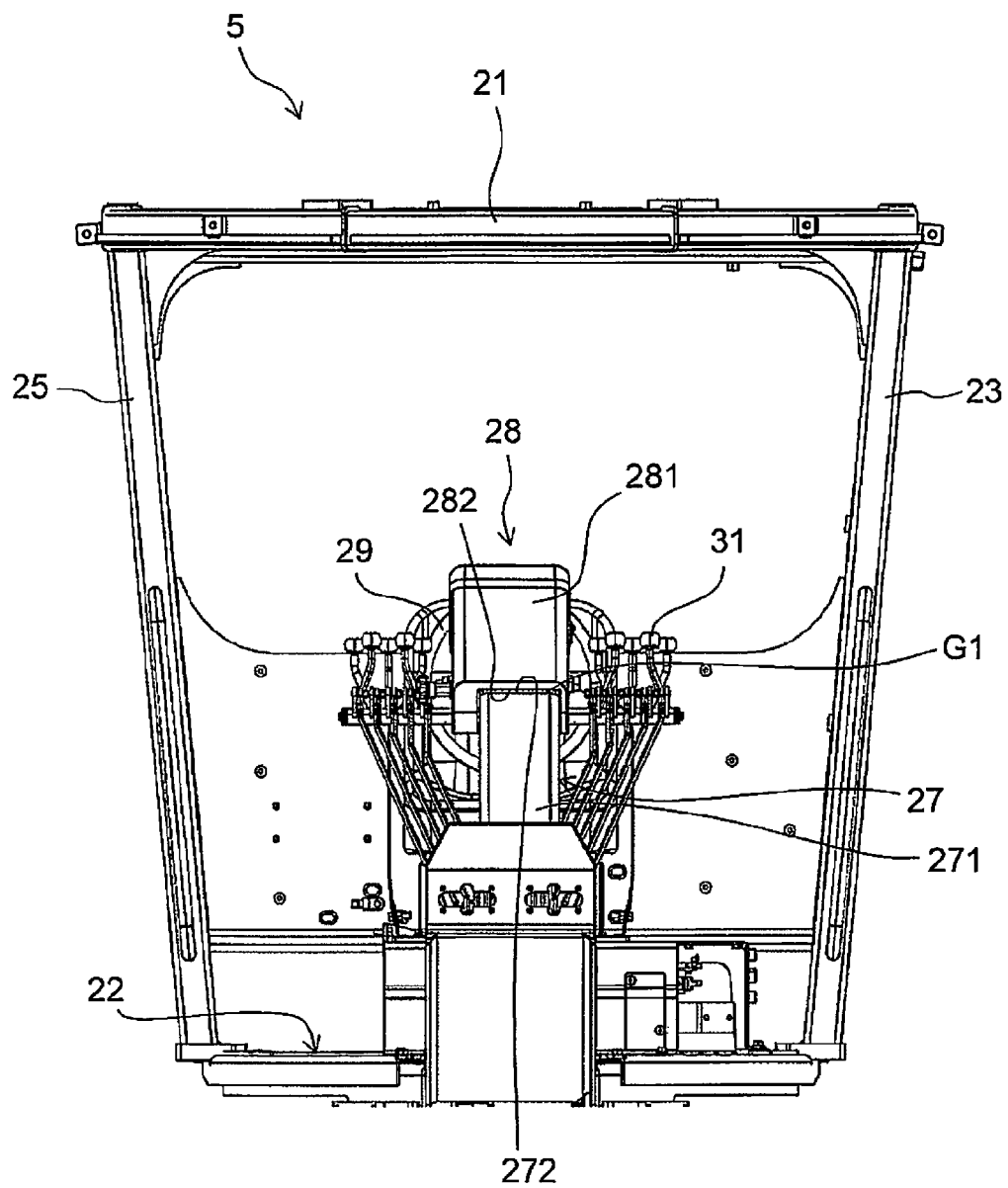
FIG. 6 is a front view of the cab in a state in which the steering member is disposed furthest to the rear.

The abovementioned FIGS. 2 and 3 illustrate a state in which the steering member 29 is disposed in a position furthest to the front (hereinbelow referred to as a "forward limit position"). FIG. 5 is a side view of the cab 5 in a state in which the steering member 29 is disposed in a position furthest to the rear (hereinbelow referred to as a "rearward limit position"). FIG. 6 is a front view of the cab 5 in a state in which the steering member 29 is disposed in the position furthest to the rear.

The following is a detailed explanation of the structures of the steering post 27 and the case section 28. As illustrated in FIG. 4, the steering post 27 has a first post member 41 and a second post member 42. The first post member 41 and the second post member 42 are separate members. The first post member 41 and the second post member 42 both extend substantially in the vertical direction. The second post member 42 is disposed to the rear of the first post member 41. The first post member 41 and the second post member 42 are combined so that a portion as seen in a side view overlaps. However, the first post member 41 and the second post member 42 are not fixed to each other and are able to move relative to each other.

The first post member 41 has a first lower tilt supporting part 411. The first lower tilt supporting part 411 is provided at a lower end part of the first post member 41. The first lower tilt supporting part 411 is attached to the floor section 22 via a first lower pin member 43. The first lower tilt supporting part 411 is attached to the floor section 22 in a rotatable manner.

The second post member 42 has a second lower tilt supporting part 421. The second lower tilt supporting part 421 is attached to a lower end part of the second post member 42. The second lower tilt supporting part 421 is attached to the floor section 22 via a second lower pin member 44. The second lower tilt supporting part 421 is attached to the floor section 22 in a rotatable manner.

The first post member 41 has a first upper tilt supporting part 412. The first upper tilt supporting part 412 is attached to an upper end part of the first post member 41. The first upper tilt supporting part 412 is attached to the case section 28 via a first upper pin member 45. The first upper tilt supporting part 412 is attached to the case section 28 in a rotatable manner.

The second post member 42 has a second upper tilt supporting part 422. The second upper tilt supporting part 422 is attached to an upper end part of the second post member 42. The second upper tilt supporting part 422 is attached to the case section 28 via a second upper pin member 46. The second upper tilt supporting part 422 is attached to the case section 28 in a rotatable manner.

The first upper pin member 45 and the second upper pin member 46 are coupled via a link member 47. The link member 47 changes the angle of the case section 28 relative to the steering post 27 in accordance with the tilt of the steering post 27 relative to the floor section 22. As a result, the angle of the case section 28 relative to the horizontal direction is uniformly maintained regardless of the angle of the steering post 27 relative to the floor section 22. That is, the case section 28 moves in a substantially parallel manner regardless of the tilt of the steering post 27 relative to the floor section 22.

As illustrated in FIG. 2, a front surface 281 of the case section 28 is inclined toward the front and downward, and a front surface 271 of the steering post 27 is inclined toward the front and upward in the forward limit position. As illustrated in FIG. 5, the front surface 281 of the case section 28 is inclined toward the front and downward and the front surface 271 of the steering post 27 is inclined toward the front and downward in the rearward limit position. As illustrated in FIGS. 2 and 5, relative positions of the front surface 281 of the case section 28 and the front surface 271 of the steering post 27 change by tilting the case section 28 relative to the steering post 27 in accordance with the tilting of the steering post 27. To avoid interference due to changing the relative positions, a gap G1 is provided between the front surface 281 of the case section 28 and the front surface 271 of the steering post 27.

FIGS. 7 to 10 are side cross-sectional views illustrating changes in the positions of the front surface 281 of the case section 28 and the front surface 271 of the steering post 27 due to tilting the steering post 27. As illustrated in FIGS. 7 to 10, the case section 28 has a case end part 282 that is positioned at a lower end of the front surface 281 of the case section 28. As illustrated in FIG. 3, the case end part 282 has a concave shape that faces upwards as seen from the front. As illustrated in FIGS. 7 to 10, the steering post 27 has a post end part 272 that is positioned at an upper end of the front surface 271 of the steering post 27. The post end part 272 is positioned below the case end part 282. The gap G1 is provided between the case end part 282 and the post end part 272.

Figure 7:
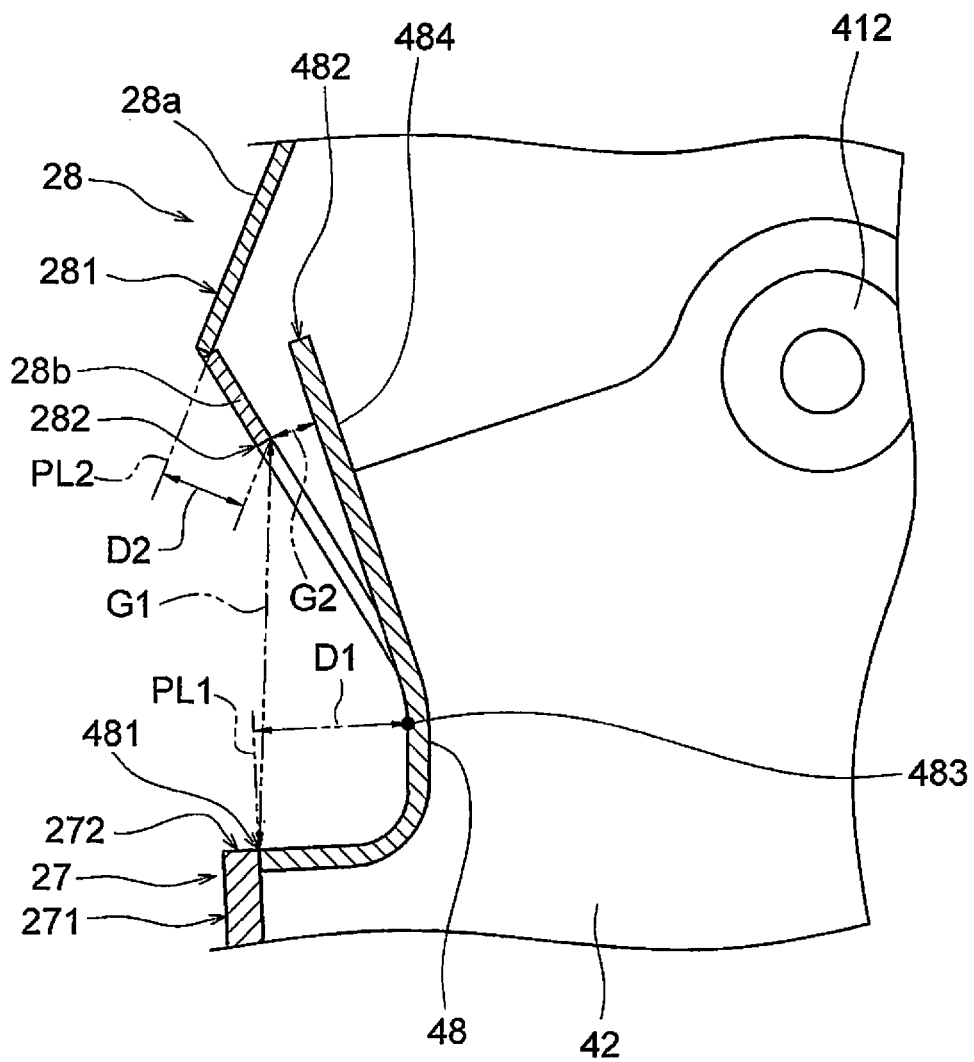
FIG. 7 is a side cross-sectional view of the case section, the steering post, and a cover member.
Figure 8:
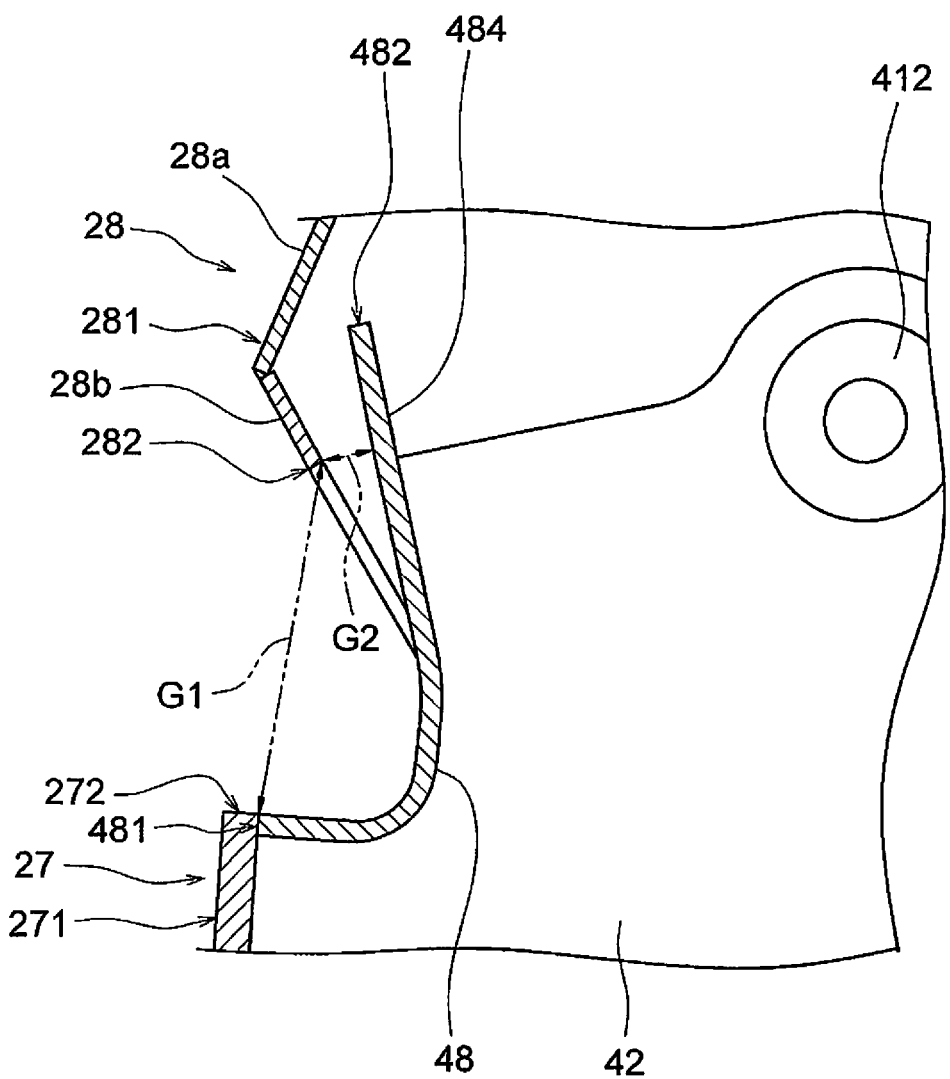
FIG. 8 is a side cross-sectional view of the case section, the steering post, and the cover member.
Figure 9:
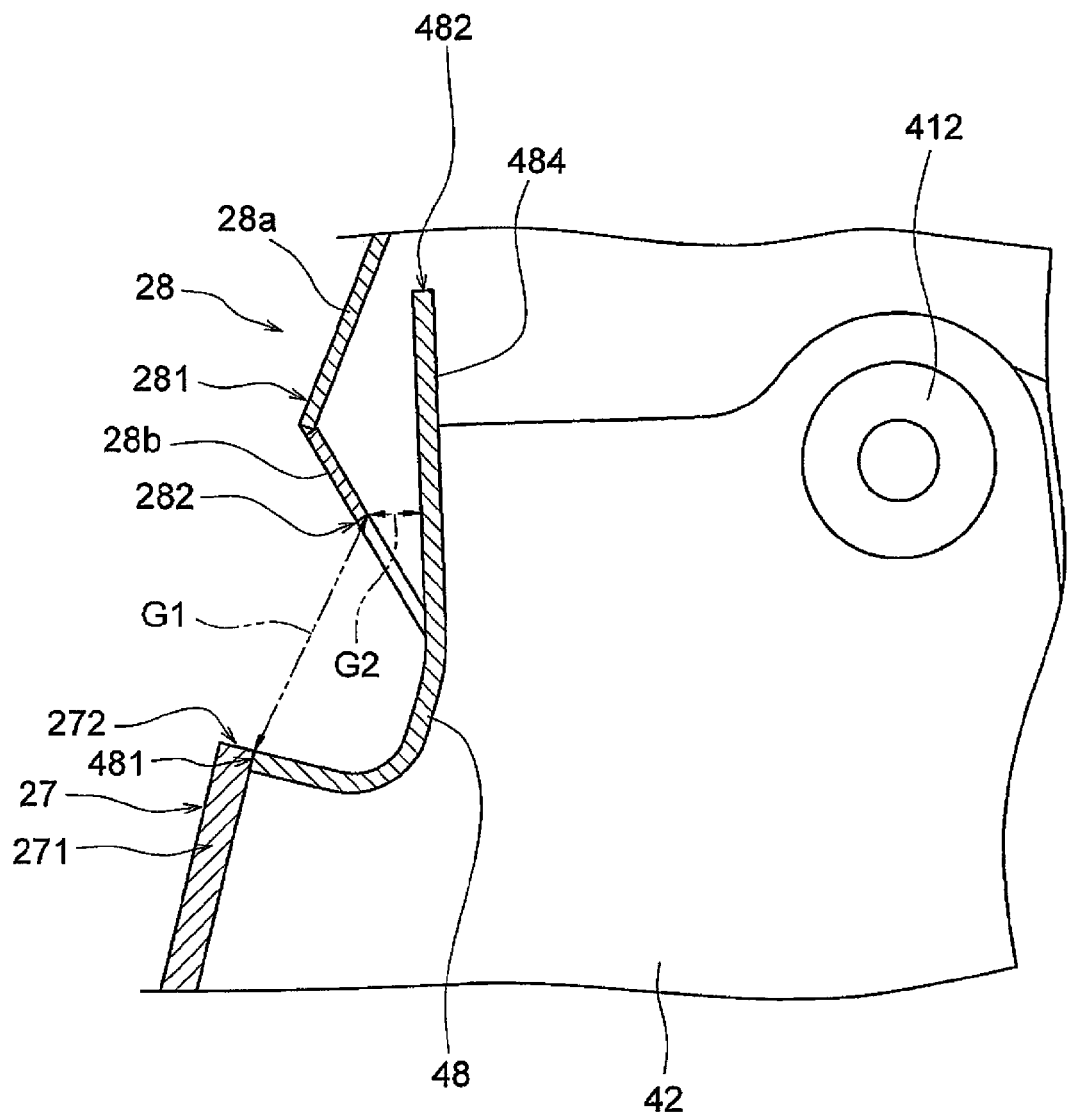
FIG. 9 is a side cross-sectional view of the case section, the steering post, and the cover member.
Figure 10:
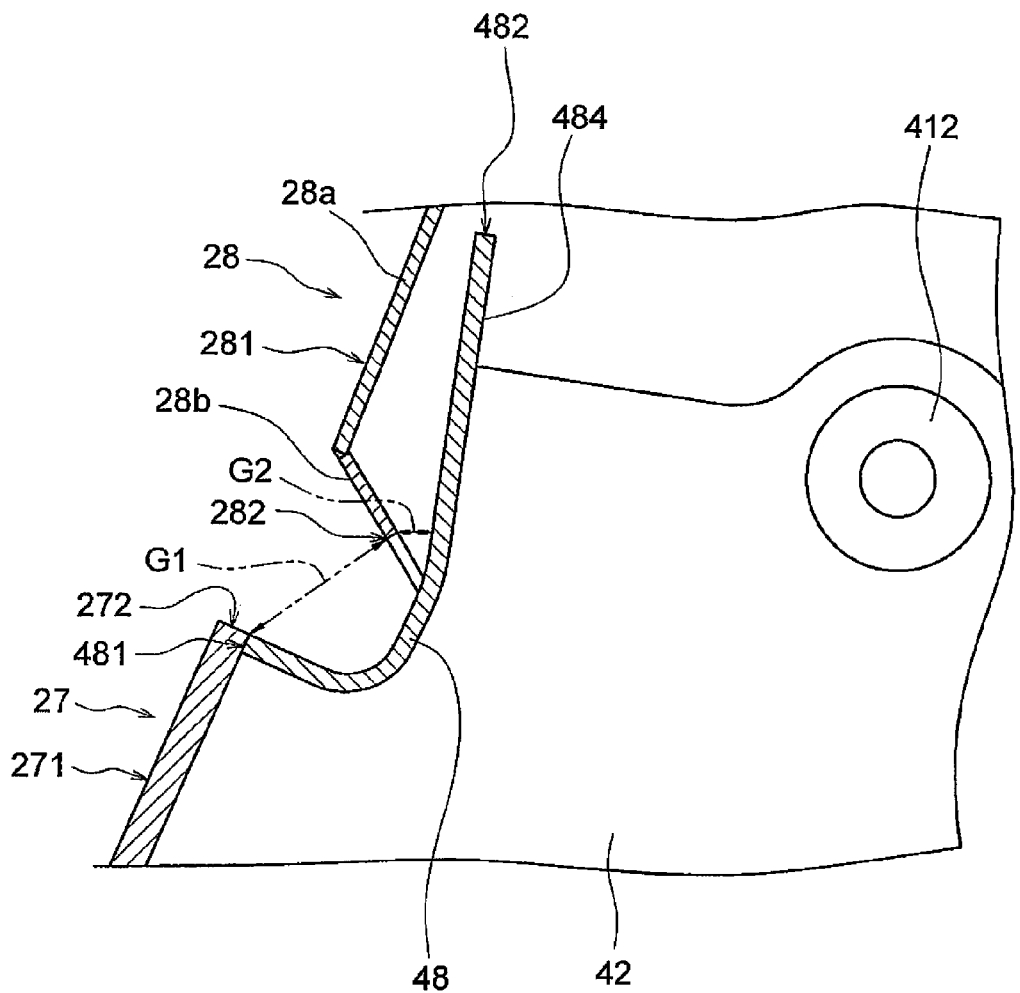
FIG. 10 is a side cross-sectional view of the case section, the steering post, and the cover member.

FIG. 7 illustrates the case section 28 and the steering post 27 in the forward limit position. FIG. 10 illustrates the case section 28 and the steering post 27 in the rearward limit position. FIGS. 8 and 9 illustrate the case section 28 and the steering post 27 in intermediate positions between the forward limit position and the rearward limit position. Specifically, FIG. 8 illustrates the case section 28 and the steering post 27 in a position (hereinbelow referred to as the "first intermediate position") when the steering post 27 has been tilted from the forward limit position toward the rearward limit position. FIG. 9 illustrates the case section 28 and the steering post 27 in a position (hereinbelow referred to as the "second intermediate position") when the steering post 27 has been tilted from the first intermediate position toward the rearward limit position.

As illustrated in FIGS. 7 to 10, a cover member 48 is attached to the steering post 27. At least a portion of the cover member 48 is disposed inside the case section 28. However, the entire cover member 48 may be disposed inside the case section 28. The cover member 48 is disposed to cover the gap G1 between the post end part 272 and the case end part 282 from the rear.

The case end part 282 has a curved shape that is inclined downward and to the rear. Specifically, the front surface 281 of the case section 28 has a main front surface part 28a and an inclined surface part 28b. The main front surface part 28a is inclined forward and downward. The inclined surface part 28b is connected to a lower end part of the main front surface part 28a and is inclined downward and to the rear with respect to the main front surface part 28a. The lower end part of the inclined surface part 28b is the case end part 282.

As illustrated in FIGS. 7 to 10, the size of the gap G1 is the greatest in the forward limit position. The size of the gap G1 is the smallest in the rearward limit position. The size of the gap G1 signifies the distance between the post end part 272 and the case end part 282.

The case end part 282 correspondingly moves toward the post end part 272 in the vertical direction as the limit position changes from the forward limit position toward the rearward limit position. The case end part 282 correspondingly moves further to the rear away from the post end part 272 as the limit position changes from the forward limit position toward the rearward limit position.

As described above, the positional relationship of the case end part 282 and the post end part 272 changes in response to the tilt of the steering post 27. The cover member 48 has a shape that is curved to not interfere with the case end part 282 regardless of any change in the positional relationship. The following describes in detail the structure of the cover member 48.

The cover member 48 is connected to the steering post 27. Specifically, a lower end part 481 of the cover member 48 is connected to the post end part 272. For example, the cover member 48 and the steering post 27 are made from metal, and the lower end part 481 of the cover member 48 is welded to the post end part 272. The cover member 48 has a cross-sectional shape of the letter J as seen in a side view. The cover member 48 has a shape that is curved convexly from the post end part 272 toward the rear.

An upper end part 482 of the cover member 48 is positioned higher than the case end part 282 inside the case section 28. As illustrated in FIGS. 7 to 10, the upper end part 482 of the cover member 48 is positioned higher than the case end part 282 throughout the entire tilting range of the steering post 27.

As illustrated in FIG. 7, the cover member 48 has a predetermined portion 483 that is furthest away from a virtual plane PL1 as seen in the side cross-sectional view. The virtual plane PL1 is a plane that includes the inner surface of the front surface 271 of the steering post 27. A distance D1 between the virtual plane PL1 and the predetermined portion 483 is greater than a distance D2 between a virtual plane PL2 and the case end part 282. The virtual plane PL2 is a plane that includes the inner surface of the main front surface part 28a of the case section 28.

Figure 11:
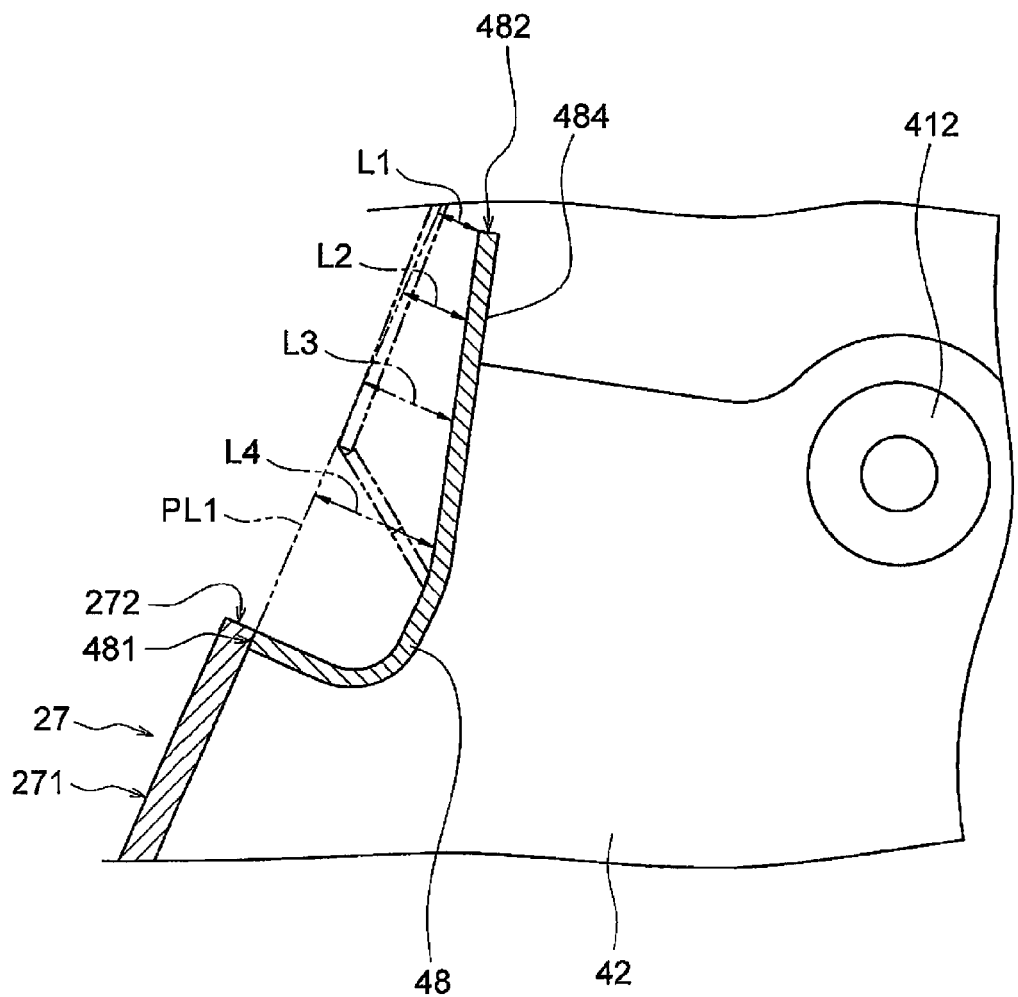
FIG. 11 is a side cross-sectional view of a case section, a steering post, and a cover member.

As illustrated in FIG. 11, the cover member 48 has an inclined part 484. The case end part 282 is disposed in a position facing the inclined part 484 throughout the entire tilting range of the steering post 27. The inclined part 484 is inclined with respect to the virtual plane PL1 that includes the inner surface of the front surface 271 of the steering post as seen in the side cross-sectional view. The inclined part 484 is inclined with respect to the virtual plane PL1 so that the distance between the virtual plane PL1 and the inclined part 484 increases toward the lower end of the inclined part 484. That is, L1 is less than L2 which is less than L3 which is less than L4 (L1<L2<L3<L4) in FIG. 11.

Due to the shape of the cover member 48 as described above, the cover member 48 is disposed with a gap G2 provided between the cover member 48 and the case end part 282. That is, the cover member 48 does not come into contact with the case end part 282 throughout the entire tilting range of the steering post 27. The gap G2 between the cover member 48 and the case end part 282 is smaller than the gap G1. The gap G2 between the cover member 48 and the case end part 282 is preferably 8 mm or less. The size of the gap G2 herein signifies the shortest distance between the cover member 48 and the case end part 282.

Figure 12:
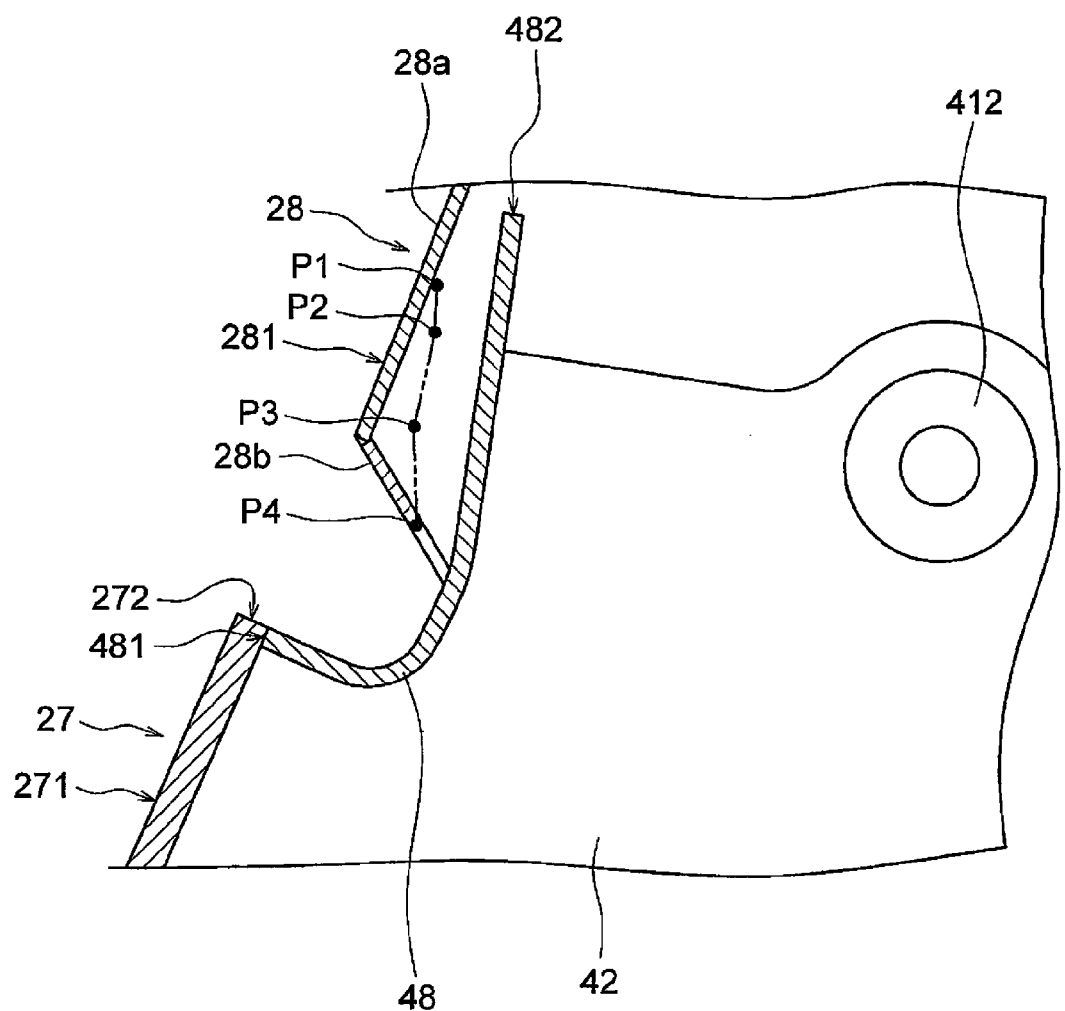
FIG. 12 illustrates relative displacement of a case end part in relation to the steering post.

FIG. 12 illustrates relative displacement of the case end part 282 in relation to the steering post 27. In FIG. 12, P1 indicates a position of the case end part 282 relative to the steering post 27 in the forward limit position. P2 indicates a position of the case end part 282 relative to the steering post 27 in the first intermediate position. P3 indicates a position of the case end part 282 relative to the steering post 27 in the second intermediate position. P4 indicates a position of the case end part 282 relative to the steering post 27 in the rearward limit position.

While the steering post 27 is tilted with respect to the floor section 22 and the case section 28 is tilted with respect to the steering post 27, the position of the steering post 27 is illustrated as fixed in FIG. 12 to illustrate the relative displacement of the case end part 282 in relation to the steering post 27. Moreover, a locus of the case end part 282 due to the case section 28 being tilted with respect to the steering post 27 is illustrated with a long dashed double-dotted line that links P1 to P4. As illustrated in FIG. 12, the cover member 48 has a shape that is curved to not intersect the locus of the case end part 282 when the case section 28 is tilted with respect to the steering post 27.

The gap G1 is provided between the post end part 272 and the case end part 282 in the motor grader 1 according to an exemplary embodiment of the present embodiment described above. As a result, interference between the case section 28 and the steering post 27 can be avoided. Moreover, waterproofing of the inside the case section 28 can be improved because the cover member 48 covers the gap G1 between the case section 28 and the steering post 27. The cover member 48 has a shape that is curved to not intersect the locus of the case end part 282 when the case section 28 is tilted with respect to the steering post 27. As a result, interference between the cover member 48 and the steering post 27 can be avoided. Moreover, the upper end part 482 of the cover member 48 is positioned above the case end part 282 inside the case section 28. As a result, waterproofing of the inside of the case section 28 is improved while the cover member 48 is disposed to not interfere with the case section 28.

The cover member 48 is disposed with the gap G2 provided between the cover member 48 and the case end part 282. As a result, interference between the case section 28 and the cover member 48 can be avoided. Moreover, wear of the cover member 48 can be suppressed in comparison to when the cover member 48 slides against the case end part 282. Furthermore, ease of assembly can be improved in comparison to when the cover member 48 is attached across the case section 28 and the steering post 27.

The case end part 282 has the inclined surface part 28b that is curved obliquely downward and to the rear. As a result, the gap G2 between the case end part 282 and the cover member 48 can be made smaller. Accordingly, waterproofing can be further improved.

The distance D1 between the virtual plane PL1 and the predetermined portion 483 furthest away from the virtual plane PL1 that includes the inner surface of the front surface 271 of the steering post 27, is larger than the distance D2 between the case end part 282 and the virtual plane PL2 that includes the inner surface of the main front surface part 28a of the case section 28. Therefore, the amount of curvature of the cover member 48 toward the rear is larger than the amount of curvature of the case end part 282 toward the rear. As a result, the motion range of the case section 28 with respect to the steering post 27 can be increased while suppressing interference between the case section 28 and the cover member 48.

Although an exemplary embodiment of the present invention has been described so far, the present invention is not limited to the above exemplary embodiments and various modifications may be made within the scope of the invention.

While the cab 5 is a canopy-type of cab that is open around the steering post 27 in the above exemplary embodiment, the cab may also be a closed cab.

Figure 13:
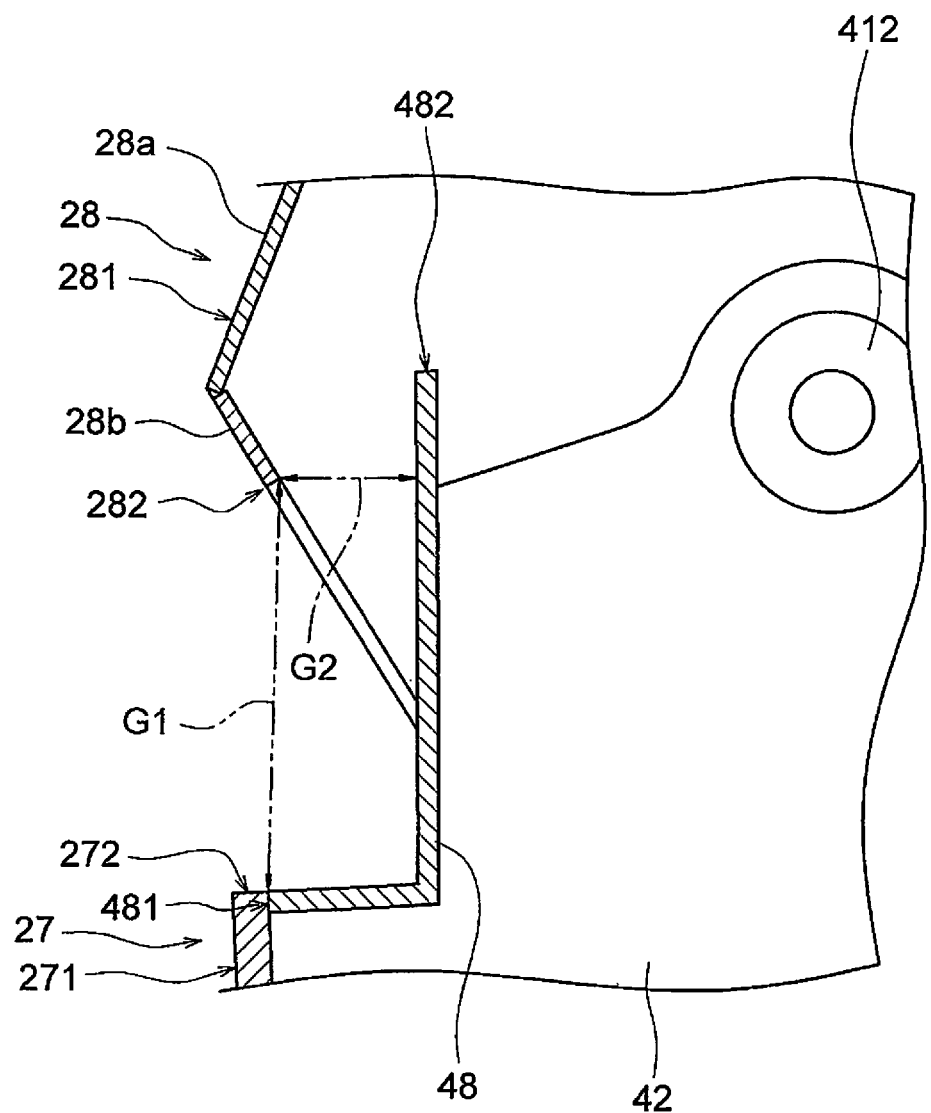
FIG. 13 is a side cross-sectional view of the cover member according to another exemplary embodiment.

The shape of the cover member 48 is not limited to the shape described in the above exemplary embodiment. For example, the cover member 48 may have a cross-section in the shape of the letter L as illustrated in FIG. 13. The case end part 282 may slide against the cover member 48 when the case section 28 is tilted with respect to the steering post 27. Alternatively, the case end part 282 may partially come into contact with the cover member 48 when the case section 28 is tilted with respect to the steering post 27.

The electric components disposed inside the case section 28 are not limited to the components described in the above exemplary embodiment. A portion of the electric components described in the above exemplary embodiment may be omitted. Alternatively, components that differ from the electric components described in the above exemplary embodiment may be disposed inside the case section 28.

The shape of the case section 28 is not limited to the shape described in the above exemplary embodiment. For example, the lower end of the front surface 281 of the case section 28 may not be curved and may have a linear shape as seen in the side cross-sectional view.

The steering post 27 may be attached to the floor section 22 in a fixed manner without tilting. That is, only the case section 28 may tilt with respect to the steering post 27 that is provided in a fixed manner. The case section 28 may have movement that differs from the substantially parallel movement in response to the tilt of the steering post 27.

The operating member 31 is not limited to a hydraulic type and may be an electrical operating member. The operating member 31 is not limited to being attached to the steering post 27 and may be attached to another member. For example, the operating member 31 may be disposed at the side of the cab 26.

According to exemplary embodiments of the present invention, a motor grader can be provided in which interference with the steering post is avoided when the case section is tilted and in which waterproofing inside the case section is improved.

What is claimed is:

1. A motor grader, comprising:
a floor section;
a cab disposed on the floor section;
a steering post disposed in front of the cab and disposed upright on the floor section;
a case section attached to the steering post in a manner that allows tilting around a center axis that extends in a vehicle width direction;
a steering member attached to the case section;
an electric component disposed inside the case section; and
a cover member attached to the steering post and at least partially disposed inside the case section;
wherein,
the steering post has a post end part positioned at an upper end on a front surface of the steering post;
the case section has a case end part positioned at a lower end on a front surface of the case section;
a gap is provided between the post end part and the case end part;
the cover member is disposed to cover the gap;
the cover member has a shape that is curved to not intersect a locus of the case end part when the case section is tilted with respect to the steering post;
a lower end part of the cover member is connected to the post end part; and
an upper end part of the cover member is disposed higher than the case end part inside the case section.

2. The motor grader according to claim 1, wherein the cover member is disposed apart from the case end part.

3. The motor grader according to claim 1, wherein, the cover member has a curved shape curving convexly toward the rear.

4. The motor grader according to claim 1, wherein: the cover member has a cross-section in the shape of the letter J.

5. The motor grader according to claim 1, wherein the cover member has a cross-section in the shape of the letter L.

6. The motor grader according to claim 1, wherein a lower part of the front surface of the case section has a curved shape inclined downward and to the rear.

7. The motor grader according to claim 6, wherein:
the front surface of the case section has
a main front surface part;
an inclined surface part connected to a lower end part of the main front surface part, the inclined surface part being inclined downward and to the rear with respect to the main front surface part; and
the cover member has a predetermined portion furthest away from a first virtual plane including an inner surface of the front surface of the steering post as seen in a side cross-sectional view, and
a distance between the first virtual plane and the predetermined portion is greater than a distance between the case end part and a second virtual plane including an inner surface of the main front surface part.

8. The motor grader according to claim 2, wherein
a lower part of the front surface of the case section has a curved shape inclined downward and to the rear.

9. The motor grader according to claim 8, wherein
the front surface of the case section has
a main front surface part;
an inclined surface part connected to a lower end part of the main front surface part, the inclined surface part being inclined downward and to the rear with respect to the main front surface part; and
the cover member has a predetermined portion furthest away from a first virtual plane including an inner surface of the front surface of the steering post as seen in a side cross-sectional view, and
a distance between the first virtual plane and the predetermined portion is greater than a distance between the case end part and a second virtual plane including an inner surface of the main front surface part.

10. The motor grader according to claim 3, wherein
a lower part of the front surface of the case section has a curved shape inclined downward and to the rear.

11. The motor grader according to claim 10, wherein
the front surface of the case section has
a main front surface part;
an inclined surface part connected to a lower end part of the main front surface part, the inclined surface part being inclined downward and to the rear with respect to the main front surface part; and
the cover member has a predetermined portion furthest away from a first virtual plane including an inner surface of the front surface of the steering post as seen in a side cross-sectional view, and
a distance between the first virtual plane and the predetermined portion is greater than a distance between the case end part and a second virtual plane including an inner surface of the main front surface part.

12. The motor grader according to claim 4, wherein
a lower part of the front surface of the case section has a curved shape inclined downward and to the rear.

13. The motor grader according to claim 12, wherein
the front surface of the case section has
a main front surface part;
an inclined surface part connected to a lower end part of the main front surface part, the inclined surface part being inclined downward and to the rear with respect to the main front surface part; and
the cover member has a predetermined portion furthest away from a first virtual plane including an inner surface of the front surface of the steering post as seen in a side cross-sectional view, and
a distance between the first virtual plane and the predetermined portion is greater than a distance between the case end part and a second virtual plane including an inner surface of the main front surface part.

14. The motor grader according to claim 5, wherein
a lower part of the front surface of the case section has a curved shape inclined downward and to the rear.

15. The motor grader according to claim 14, wherein
the front surface of the case section has
a main front surface part;
an inclined surface part connected to a lower end part of the main front surface part, the inclined surface part being inclined downward and to the rear with respect to the main front surface part; and
the cover member has a predetermined portion furthest away from a first virtual plane including an inner surface of the front surface of the steering post as seen in a side cross-sectional view, and
a distance between the first virtual plane and the predetermined portion is greater than a distance between the case end part and a second virtual plane including an inner surface of the main front surface part.

* * * * *